Aug. 17, 1954  J. E. LILIENFELD  2,686,892
ELECTROLYTIC CAPACITOR AND METHOD OF CONSTRUCTING THE SAME
Filed June 27, 1951  7 Sheets-Sheet 3
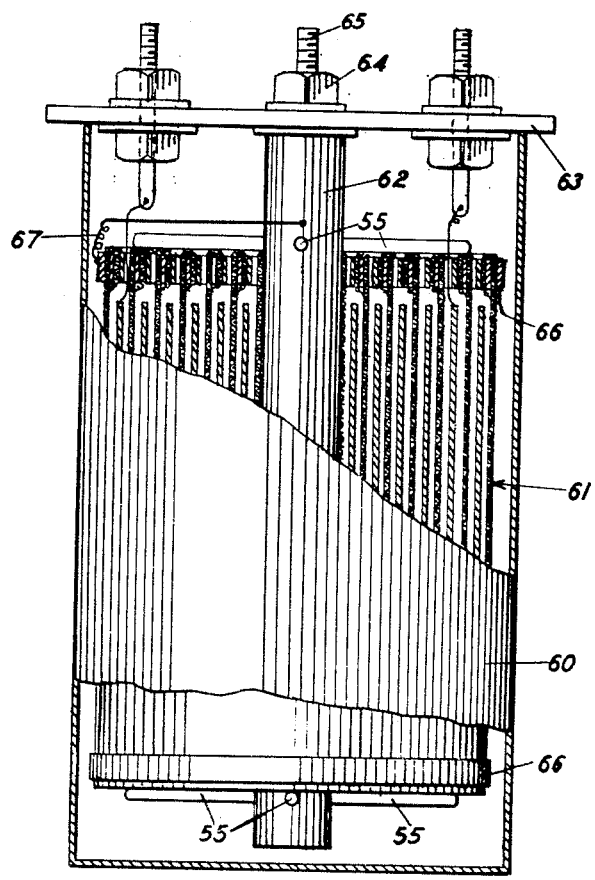
INVENTOR.
JULIUS EDGAR LILIENFELD
BY Emery, Holcombe & Blair
ATTORNEYS Aug. 17, 1954   J. E. LILIENFELD   2,686,892
ELECTROLYTIC CAPACITOR AND METHOD OF CONSTRUCTING THE SAME
Filed June 27, 1951   7 Sheets-Sheet 4
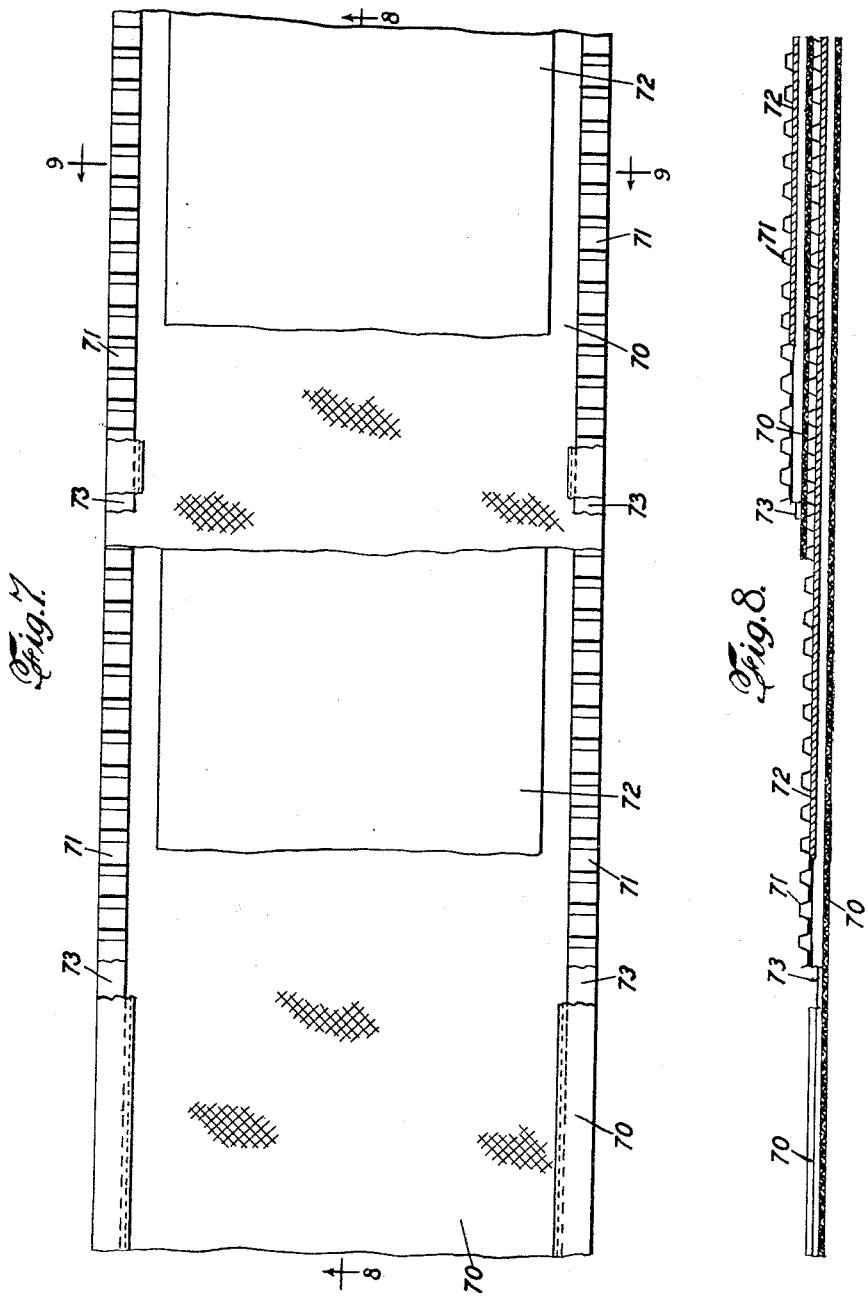
INVENTOR.
JULIUS EDGAR LILIENFELD
BY Emery, Holcombe a Blair
ATTORNEYS.

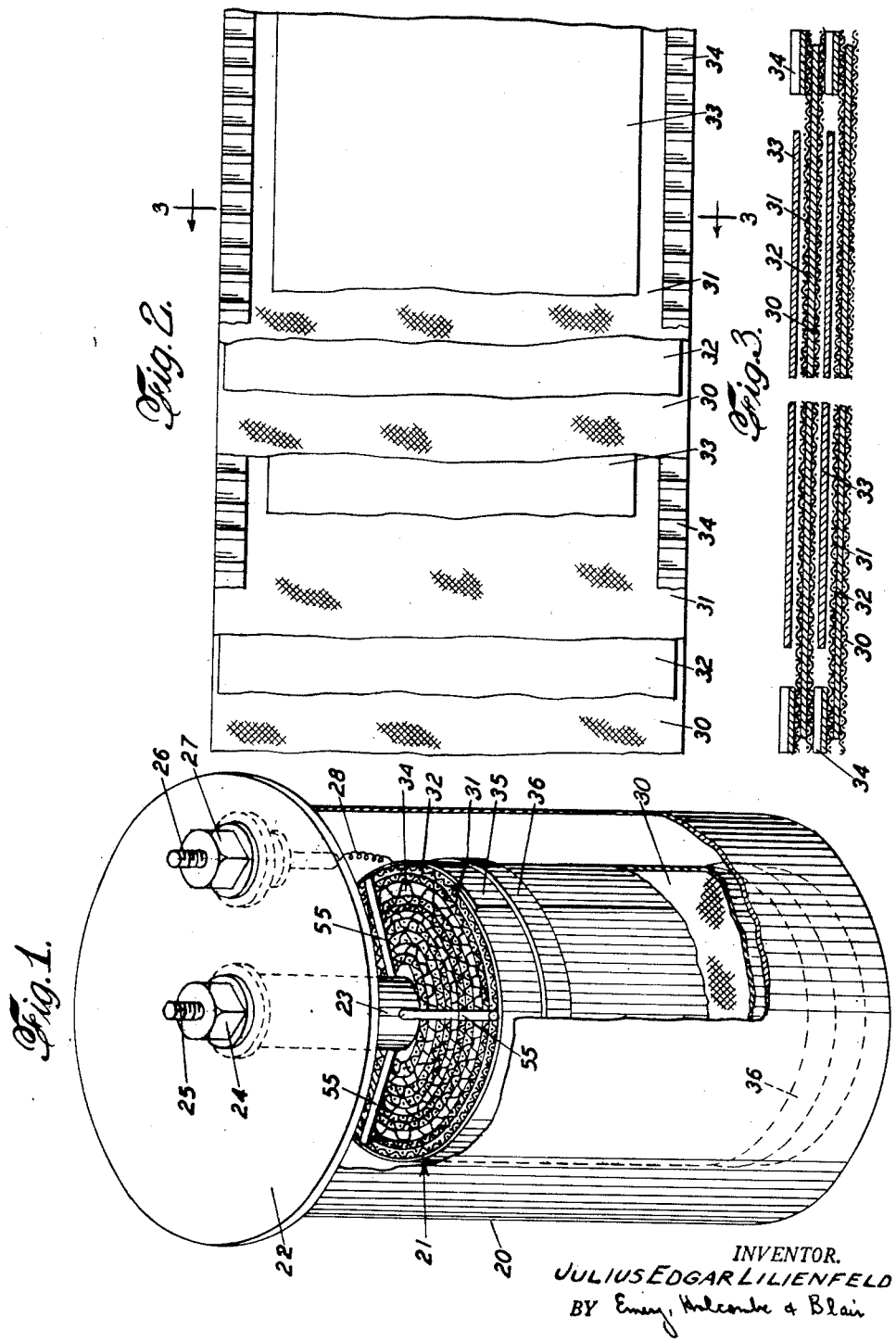

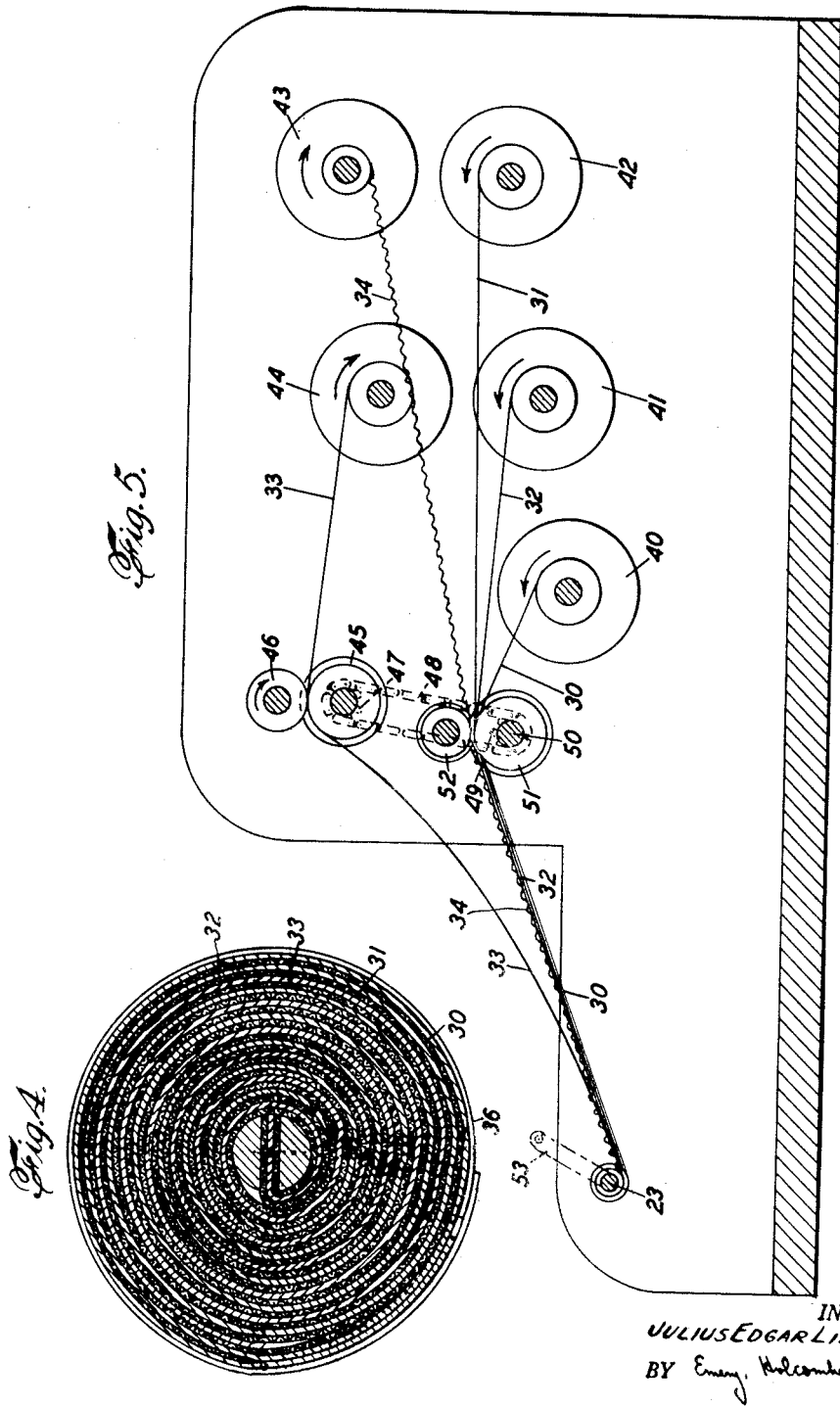

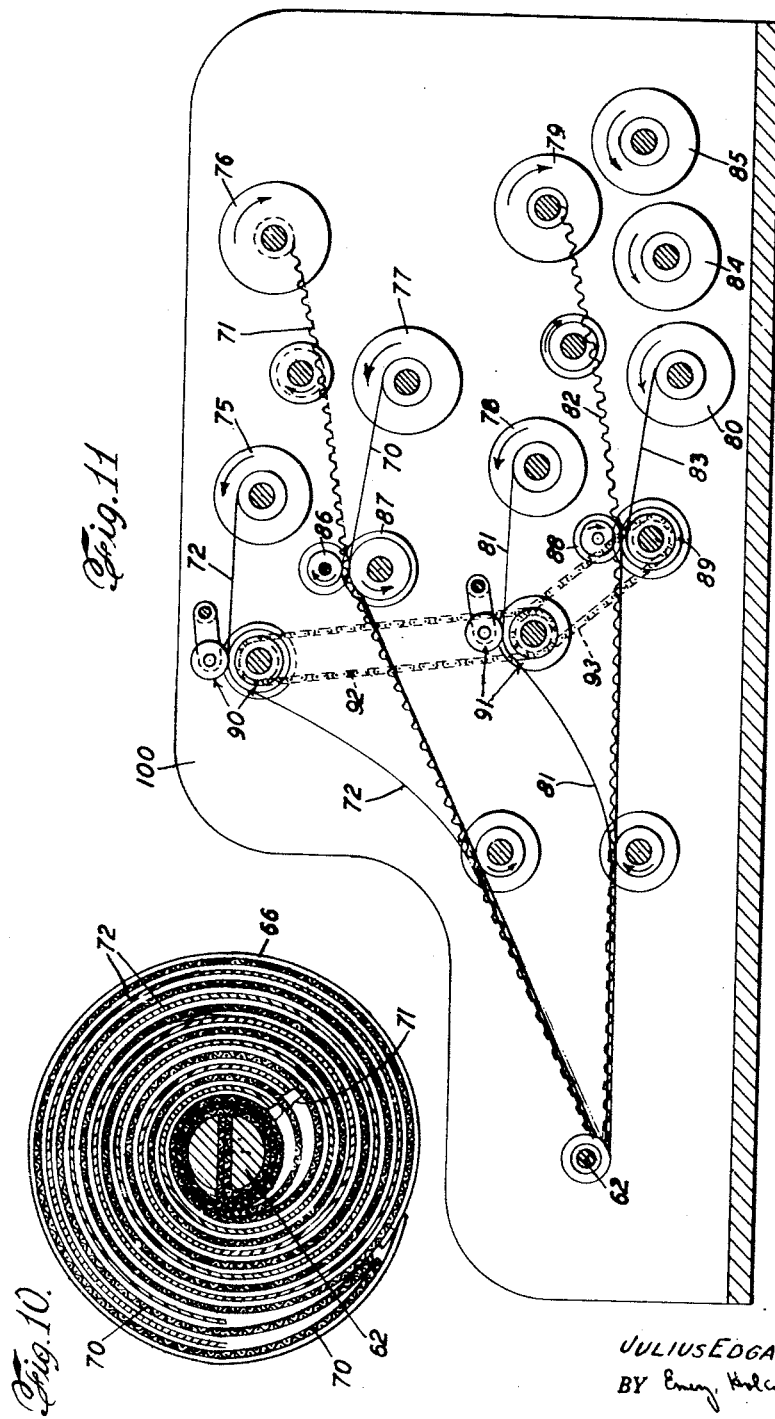

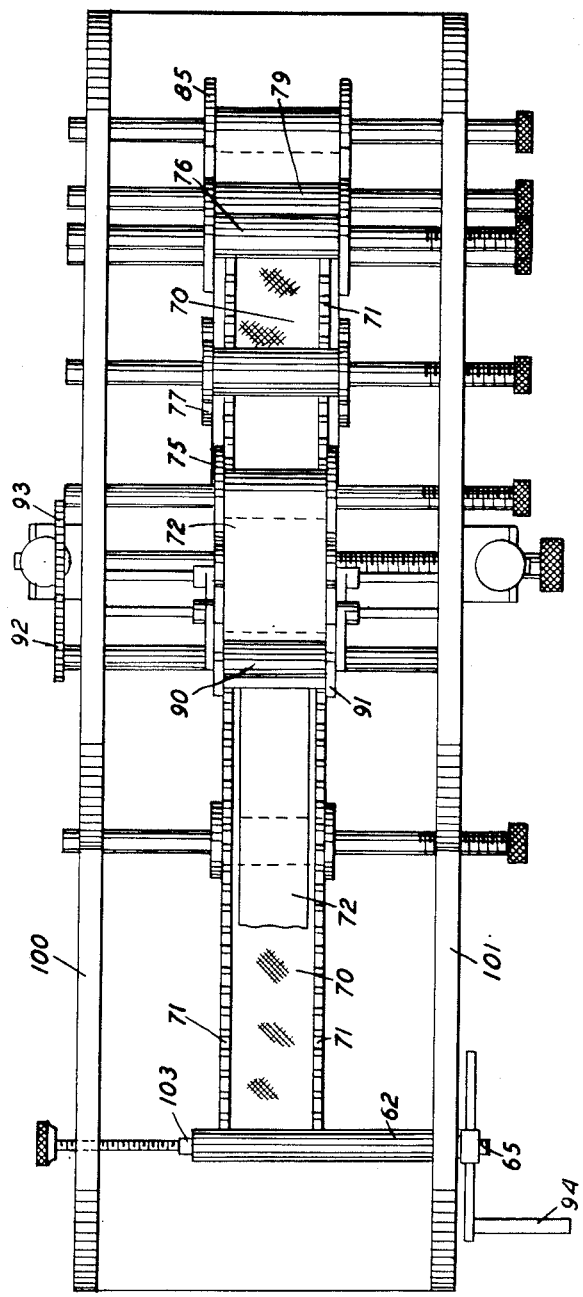

Aug. 17, 1954          J. E. LILIENFELD          2,686,892
ELECTROLYTIC CAPACITOR AND METHOD OF CONSTRUCTING THE SAME
Filed June 27, 1951                      7 Sheets-Sheet 7
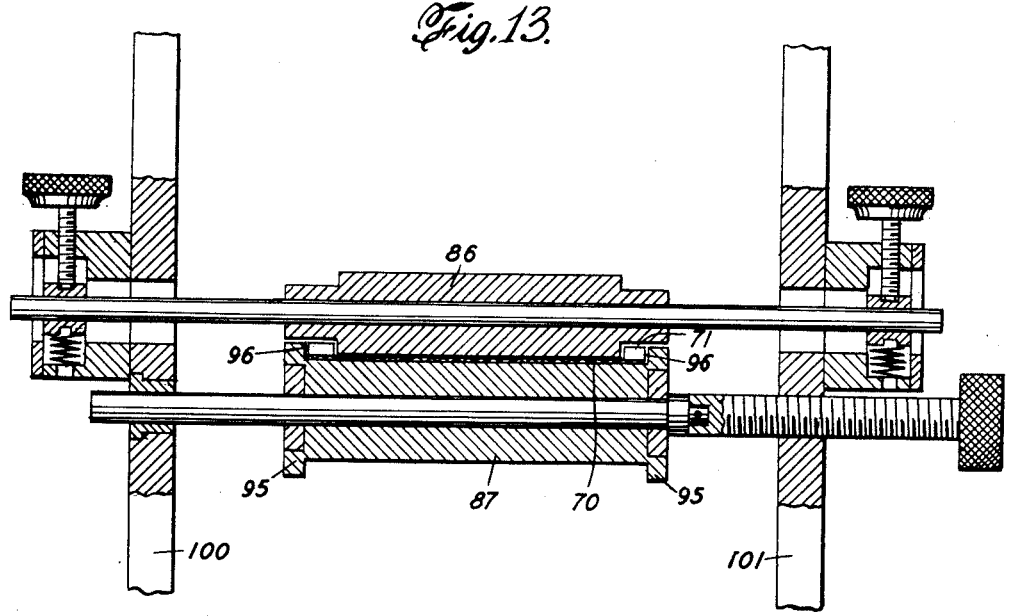
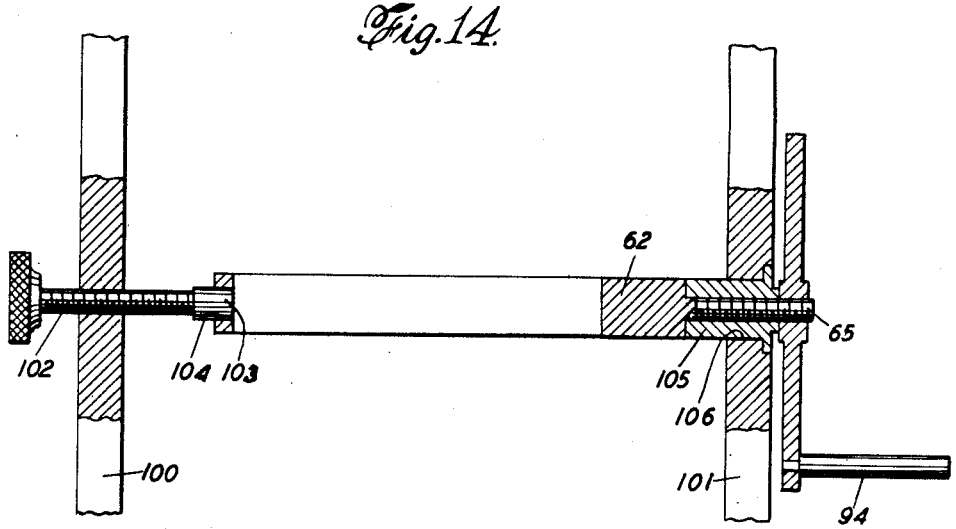
INVENTOR.
JULIUS EDGAR LILIENFELD
BY Emery, Holcombe & Blair
ATTORNEYS Patented Aug. 17, 1954

2,686,892

UNITED STATES PATENT OFFICE 2,686,892

ELECTROLYTIC CAPACITOR AND METHOD OF CONSTRUCTING THE SAME

Julius Edgar Lilienfeld, St. Thomas, V. I., assignor to Samuel D. Warren, Essex, and Ralph F. Burkard, Arlington, Mass., jointly Application June 27, 1951, Serial No. 233,884

13 Claims. (Cl. 317—230)

The invention relates to electrolytic capacitor construction embodying condensers of the coiled type having band or strip electrodes, and utilizing an electrolyte of low viscosity, for example, an aqueous electrolyte; and it relates more particularly to the support and retention of the anodized electrode or electrodes of the condenser unit relatively to other elements of said unit; also to a novel method of introducing the anodizable electrode or electrodes in the coiling of a unit.

It has for an object to more or less float the anodized element in the electrolyte by virtue of the latter's viscosity and adhesion, while retaining said element's special position between porous separator elements of the condenser unit.

A further object of the invention is to afford a support for the anodized element such that uniform and narrow spacing between electrodes is attained, which will permit of the use of an electrolyte having high specific resistance—of the order of magnitude of at least 10,000 ohms per cu. cm.

A still further object of the invention is to provide an anode mounting of the aforesaid nature suitable for use in either the polarized or the nonpolarized type of capacitor.

Another object of the invention is to provide a novel spacing arrangement which will not impede the electrolyte circulation and will also enhance as well the escape of any gases generated in the capacitor.

Still another object is to avoid in this coiled type of capacitor power losses which would develop between such areas of the electrodes as correspond electrically but do not face each other across the narrow spacing.

The invention has for its object, also, to provide a novel method for coiling the various condenser elements whereby the anodizable element or elements are not subjected to tension in the coiling operation so as to locate such element loosely, due to viscosity and adhesion of the electrolyte, within a channel portion of the assembly.

In carrying out the invention, instead of coiling a plurality of condenser band elements into a more or less tightly wound assembly, the novel method contemplates the feeding of an anodizable metal band or bands, during the coiling operation, in a manner such that a slack or bight portion is afforded therein by causing its leading end to remain unattached and resting upon a separator band. The latter, with the remaining bands, is attached in the conventional manner to the mandrel by which the assembly is coiled in the rotation of said mandrel; and during the coiling operation is maintained more or less taut.

The loosely fed anodizable element or elements are arranged to become located laterally between a pair of spacer elements without contacting them, the said spacer elements to this end being provided along the marginal portions of the respective separator bands in the case of a nonpolarizable type of capacitor. In the case of a polarized capacitor, however, a spacer element may be provided along the margins of only one of the separator bands. Such anodizable element or elements are thus loosely extended through a continuous channel but without contacting the marginal spacer elements and therefore not subjected to any pressure in the spirally coiled assembly which constitutes the condenser.

The nature of the invention, however, will best be understood when described in connection with the accompanying drawings, in which:

Fig. 1 illustrates in isometric projection the novel capacitor as embodied in the polarized form, a portion of the container for the electrolyte and of the coiled condenser assembly being broken away to disclose elements of the latter.

Fig. 2 is a fragmentary plan view of an uncoiled section of the condenser elements, on an enlarged scale.

Fig. 3 is a transverse section taken on the line 3—3, Fig. 2 of the drawings, and looking in the direction of the arrows, the section being shown on an exaggerated scale.

Fig. 4 is a horizontal section through a mandrel and condenser elements attached at one end to the said mandrel and coiled about the same.

Fig. 5 is a longitudinal section through a winding mechanism suitable for coiling the condenser elements on a mandrel, and operating in the novel manner to feed the anodizable element such that a slack portion is afforded therein.

Fig. 6 is a front elevation of a capacitor as embodied in a nonpolarized form and partly in vertical section and with portions of the electrolyte container and coiled condenser assembly broken away to disclose the interiors.

Fig. 7 is a fragmentary plan view of an uncoiled section, on an enlarged scale, illustrating the assembly shown in Fig. 6.

Fig. 8 is a side view thereof.

Fig. 9 is a transverse section taken on the line 9—9, Fig. 7 of the drawings, and looking in the direction of the arrows.

Fig. 10 is a view, is horizontal section, similar to Fig. 4 but of the condenser elements of a capacitor of the nonpolarizable type.

Fig. 11 is a longitudinal section through a winding mechanism suitable for coiling the condenser elements of the nonpolarizable type, said mechanism operating in novel manner to feed a plurality of anodizable elements such that respective slack or bight portions are afforded therein.

Fig. 12 is a plan view of the winding mechanism shown in Fig. 11.

Fig. 13 is a fragmentary longitudinal section, on an enlarged scale, through a driving and idler roller unit.

Fig. 14 is a fragmentary longitudinal section, on an enlarged scale, through the removable mandrel upon which the electrodes and other elements are wound.

Fig. 15 is a cross-sectional view showing a modification in the spacer members.

Referring to the drawings, more particularly Figs. 1–4 which have reference to the polarizable type of capacitor, a suitable container 20 is provided for electrolyte and the coiled condenser assembly 21. The latter is carried by a top 22 removably secured to the mandrel 23 as by the nut 24 working on the threaded extension 25 of the mandrel which extends exteriorly of the container to afford one connection terminal of the capacitor. A further threaded terminal extension 26 extends above the top 22 and there is fitted thereon a threaded nut 27 to afford with the extension the anodizable element terminal. A connecting lead 28 is provided for this purpose from the inner end of the extension 26 to the anodizable element of the condenser assembly.

In accordance with the invention, the assembly comprises two coiled separator bands 30 and 31 of insulating porous material which will permit free flow of ions through the electrolyte to the electrodes and is harmless to said electrolyte in order that the latter may not become contaminated and the efficiency of the capacitor impaired. It should also be resistant to heat and of such a nature that it will not mechanically injure or scratch the anodized electrode surface. Surgical gauze, pure silica gauze or glass wool containing no ingredients which would contaminate the electrolyte have been found satisfactory; and may be in woven form or as felted fabrics, preferably the former because of greater and more uniform porosity. In order to position more accurately an anodizable element of the condenser on its separator band, small particles (not shown) of foam rubber may be distributed so as to adhere to the juxtaposed surface of the fabric material.

Between the bands 30 and 31 is located a cathode element 32 in the nature of a continuous non-filmable metallic band, the anode element 33 which is of filmable metal, such as dead soft annealed aluminum foil, being located between the bands 31 and 30. This anode element, in accordance with the invention, must remain loosely mounted between the bands 31 and 30 and in a manner such that pressure will not be exerted thereon. To this end, there is provided along the marginal portions of the band 31 spacer members 34 forming between them with the intermediate separator band 31 a longitudinal channel over the cathode, in which channel the anode is freely supported as the various condenser elements are coiled about one another. This is more clearly indicated in Fig. 3 of the drawings, which shows several convolutions of the condenser assembly. The entire assembly is encased in a nonfilmed metal casing or sheath 35 which may be a continuation of the cathode elements, as is indicated in Fig. 4 of the drawings, and retained by straps 36.

To effect this winding of the condenser elements into the condenser assembly 21, an apparatus such as that shown in Fig. 5 may be utilized. As shown, this comprises a plurality of rotatably mounted rolls 40, 41, 42, 43 and 44 carrying respectively a porous separator band 30 of, for example, fibrous insulating material, the cathode band 32, a second band of fibrous insulating material 31, the marginal spacer elements 34, and the anodizable band 33. These various bands are advanced by being brought between driving and idler rollers. The band 33 is drawn from its roller 44 by passing between the driving roller 45 and an idler 46, the former being driven through a sprocket 47 and a sprocket chain 48 driven from a sprocket 49 on a shaft 50.

On the said shaft 50 and rotating therewith is also a driving roller 51 engaging an idler 52 between which and said roller are brought the bands 30, 32, 31 and the spacer elements 34, all except the spacer elements having their leading ends secured in the slot of mandrel 23 for coiling. The leading end of the band 33, also, is not attached to the mandrel but a bight or slack portion rests upon the separator band 31, which latter is maintained more or less taut during the coiling operation, and the said band 33 thus has a bight or slack portion, as is indicated in the drawing, during its forward feed into the channel formed on the said band 31 between the marginal spacer elements 34 thereof. To effect the coiling, mandrel 23 is rotated, for example, manually through a crank 53 attachable thereto, as is more specifically disclosed in connection with the coiling apparatus shown in Figs. 11 to 14, inclusive.

The speed ratio of the feed effected by roller 51 and idler 52 to that effected by roller 45 and idler 46 is preferably such that the unstretched band 33 of anodizable metal is fed at approximately the same rate as the taut separator band 31, upon which it rests and by which it is carried along, the bands 30, 32, and the spacer strips 34 associated with said separator band. The advance of the various bands results from the rotation of the mandrel 23 by means of the crank handle 53.

In order to prevent axial displacement of the convolutions of the coiled condenser assembly, pins 55 are provided to extend radially outwardly from the mandrel at opposite ends of the assembly, as is indicated in Fig. 1.

A loosely-fed anodizable band, or bands in the case of the nonpolarizable type of condenser, is thus arranged to extend between a pair of spacer elements along the channel formed thereby and without contacting them. The said spacer elements to this end are provided along marginal portions of a separator band or bands; and a said anodizable band is thus loosely extended along a continuous channel and, due to viscosity and adhesion of the electrolyte, is not subjected in the capacitor operation to the pressure which would otherwise arise due to the direct contact between film and fibre of the separator band in the spirally coiled assembly constituting the condenser. However, in the case of the polarizable type of capacitor, it is not essential to float both of the metal bands, to wit: the non-filmable one need not be floated, and it may be made of substantially the same width as a separator band and serve as a support to the marginal spacer elements.

By the expedient, hereinbefore described, of providing a channel portion along a separator band to accommodate the band 33 of anodizable metal, the latter may be closely juxtaposed to its companion electrode—in the embodiment disclosed, the cathode band 32—so that electrolytes of extremely high specific resistance may be utilized with the capacitor, for example, an electrolyte of the nature set forth in my copending application, Serial No. 181,426 filed August 25, 1950. Furthermore, absence of substantial pressure exerted upon such anodized electrodes by the separator fibre when coiled into a condenser assembly substantially eliminates direct contact between film and fibre to the effect that the electrolyte clinging by adhesion to the surface of both film and fibre is nowhere fully displaced.

The same holds true when no unfilmed electrode is present, as in the case of a capacitor of the nonpolarized type, such as is set forth in Figs. 6 to 10, inclusive. Referring particularly to Fig. 6 of the drawings, there is provided a suitable container 60 for electrolyte and the coiled condenser assembly 61. The latter, as in the case of the embodiment hereinbefore described, may be carried by a mandrel 62 removably secured to a top 63 for the container, as by means of a nut 64 working on the threaded extension 65 of the mandrel which extends exteriorly of the container. In this embodiment, the said mandrel may serve as a further terminal to introduce a negative potential to the electrolyte to bias the capacitor, for example, in the manner disclosed by U. S. Patent No. 926,128 to Moscicki.

In said embodiment which involves a plurality of anodizable electrodes, there will exist electrically corresponding areas which do not face each other such, for example, as the inner faces of the anodizable bands juxtaposed to the mandrel and their outer faces juxtaposed to the nonanodized strap members 66 about the condenser assembly. The said mandrel and enveloping strap members are then to be interconnected electrically as by means of a low-resistance conductor 67.

The winding of this condenser is similar to that of the polarizable type except that no cathode band is present, the same being replaced by an anodizable band. An assembly of two like units is to be coiled in this instance, each unit comprising a band of insulating material 70 with marginal spacer elements 71 to form the channel along which an anode 72 is extended. One such unit is superposed upon the other and both are then spirally wound upon the mandrel 62. In order to prevent interlocking of the corrugations of the superposed marginal spacer elements 71, the same may be of special form; or, narrow strips 73 of suitable neutral material are to be located along the marginal portions of the fabric bands and immediately beneath the respective corresponding separators. These strips 73, as of nonfilmable metal, plastic, etc., may conveniently be retained to a corresponding fabric separator band by stitching the latter over the former, as is indicated in Fig. 9. Or, the strips 73 may be dispensed with and the spacers formed of several folds 74 of the porous fibrous material secured to the separator bands 74', as is indicated in Fig. 15.

In effecting the coiling of the various bands or strips for the production of the nonpolarized form of the condenser, a modification in the apparatus is required, reference being had to Figs. 11 and 12. Two superposed winding sets are utilized for this purpose, the upper one comprising the supply rolls 75, 76 and 77 for one of the anodizable metal bands 72, the marginal spacers 71, and the separator band 70 with enclosed strip 73, respectively. The lower set comprises similar rolls 78, 79 and 80, respectively, for the second anodizable band 81, the marginal spacer 82, and the separator band 83, with enclosed strip. Two further rolls 84 and 85 may be associated with this lower set, the former to afford a cathode band and the latter a fabric band (both not shown). They are used only when it is desired to wind a polarizable type of the condenser and in which case only the lower set of the apparatus is operated.

For providing the coiled nonpolarized condenser, both sets are utilized, with rolls 84, 85 not loaded; and the bands, with the exception of the anodizable ones 72 and 81, are continued through respective pairs of idler and driving rollers 86—87 and 88—89 interconnected by suitable sprocket chains, as in the case of the embodiment described in Fig. 5, to feed said bands forward to the mandrel 62. The anodizable bands 72 and 81 which advance freely, as hereinbefore described, along the respective channels provided therefor, are fed by respective sets 90 and 91 of idler and driving rollers connected through sprocket chains 92 and 93 with the idler-driving-roller set 88—89 so as to feed forward said bands 72 and 81 at substantially the same rate as that of the remaining bands.

Power is derived from a crank handle 94 shown as manually operable and removably secured to the mandrel 62. In advancing the spacer bands through their respective driving and idler rollers, the latter, Fig. 13, are reduced in diameter at their ends to provide, with end flanges 95 of the rollers, end recesses 96 to accommodate the spacer bands, for example, band 71 travelling with separator 70.

The mandrel 62 is mounted for rotation between the two side plates 100 and 101 supporting the various rolls and rollers, and in such a manner that it is removable for replacement when a condenser unit has been coiled about it. For example, reference being had to Fig. 14 of the drawings, a stud 102 has threaded engagement with plate 100 to pass adjustably therethrough and at its inner end terminates in a journal portion 103 designed to fit into the bore 104 of the juxtaposed end of the mandrel. The mandrel at its opposite end is provided with a flanged journal portion 105 fitting a bearing 106 of the opposite frame plate 101 and screwed upon the threaded stem extension 65 which is designed to have threaded thereover also the crank 94, the threading being such that crank 94 and the flanged journal portion 105 will remain on the stem and may be turned in the proper winding direction. However, when reversed, they may be uncoupled to release the mandrel with condenser unit, journal portion 103 to this end being backed out of the mandrel and the portion 105 thereof unscrewed from stem extension 65.

I claim:

1. In the manufacture of electrolytic capacitors of the coiled type condenser assembly comprising a wide separator band and a narrower anodizable band with narrow spacer bands adjacent to the edges thereof, the method of coiling the plurality of bands to constitute the condenser assembly which includes feeding such a separator band and maintaining it taut, feeding a spacer band upon each margin of said separator band and an anodizable band therebetween with its leading end free and a following portion resting freely upon said taut portion of said separator band between said spacer bands, advancing said taut separator band, spacer bands and anodizable band together throughout the coiling process, thereby providing a slack portion of said anodizable band lying in the space between said spacer bands and taut anodizable band, and coupling the rate of feed of the anodizable band to that of the separator band to maintain said slack portion continuously throughout the coiled condenser assembly.

2. The method of coiling bands of a coiled type condenser assembly capacitor according to claim 1, wherein the rate of feed of the slack anodizable band is effected at substantially the same rate as that of the separator band upon which it is supported.

3. In a coil type electrolytic capacitor: a condenser unit comprising at least two coiled separator bands of insulating porous material; a pair of spacer elements along the respective marginal portions of at least one of the bands to afford a continuous channel therebetween; and continuous metal bands between the separator bands, at least one of said metal bands having a narrower width than said last-named separator band and being anodized and loosely extended within and along said channel substantially to float therein by virtue of viscosity and adhesion of the electrolyte.

4. A condenser assembly embodying a plurality of units according to claim 3, said units each comprising a band of insulating porous material with marginal spacer elements and anodized band within the channel formed thereby, and said units being superposed and spirally coiled about one another.

5. A condenser unit of an electrolytic capacitor according to claim 3, wherein the marginal spacer elements are narrow strips of corrugated material.

6. A condenser unit of an electrolytic capacitor according to claim 5, wherein the marginal spacer elements are of nonfilmable metal.

7. A condenser unit of an electrolytic capacitor according to claim 6, wherein blocking strips are provided beneath the respective spacer elements, and the respective lateral portions of the separator bands are turned over the blocking strips and are secured to the intermediate portion of said bands.

8. A condenser unit of an electrolytic capacitor according to claim 3, wherein the spacer elements are narrow strips of porous fibrous material.

9. A condenser unit of an electrolytic capacitor according to claim 3, wherein means are provided to prevent axial displacement of the convolutions constituting the condenser unit.

10. A condenser unit of an electrolytic capacitor according to claim 3, wherein means are provided about the periphery of the coiled unit to prevent the insulating porous material bands, the spacer elements, and the metal bands from uncoiling.

11. A condenser unit of an electrolytic capacitor according to claim 3, wherein a metal mandrel is provided and the bands of insulating porous material and a non-anodizable band are held at one end thereto.

12. A condenser unit of an electrolytic capacitor according to claim 11, wherein an envelope of non-anodized metal is secured about the periphery of the coiled unit, the insulating porous material bands, the spacer elements, and the metal bands.

13. A condenser unit of an electrolytic capacitor according to claim 12, wherein electrically conductive means are provided to connect the envelope to the mandrel.

References Cited in the file of this patent

UNITED STATES PATENTS

| Number | Name | Date |
| --- | --- | --- |
| 1,841,628 | Pickard | Jan. 19, 1932 |
| 1,918,717 | Ruben | July 18, 1933 |
| 1,940,847 | Danzieger | Dec. 26, 1933 |
| 2,012,691 | Poitras | Aug. 27, 1935 |
| 2,094,048 | Siegel | Sept. 28, 1937 |
| 2,213,209 | De Lange | Sept. 3, 1940 |
| 2,220,887 | Claassen | Nov. 12, 1940 |
| 2,310,071 | Frisch | Feb. 2, 1943 |

FOREIGN PATENTS

| Number | Country | Date |
| --- | --- | --- |
| 627,333 | Great Britain | Feb. 21, 1947 |